Sept. 27, 1960 M. V. JOHNSON, JR., ET AL 2,953,987
ROTARY INKING RIBBON TUBE
Original Filed Feb. 2. 1956 7 Sheets-Sheet 1

INVENTORS.
MAURICE V. JOHNSON JR.
DONALD C. SAVAGE
By Lyon & Lyon
ATTORNEYS

Sept. 27, 1960 M. V. JOHNSON, JR., ET AL 2,953,987
ROTARY INKING RIBBON TUBE
Original Filed Feb. 2. 1956 7 Sheets-Sheet 2

INVENTORS.
MAURICE V. JOHNSON JR.
DONALD C. SAVAGE
BY
ATTORNEYS

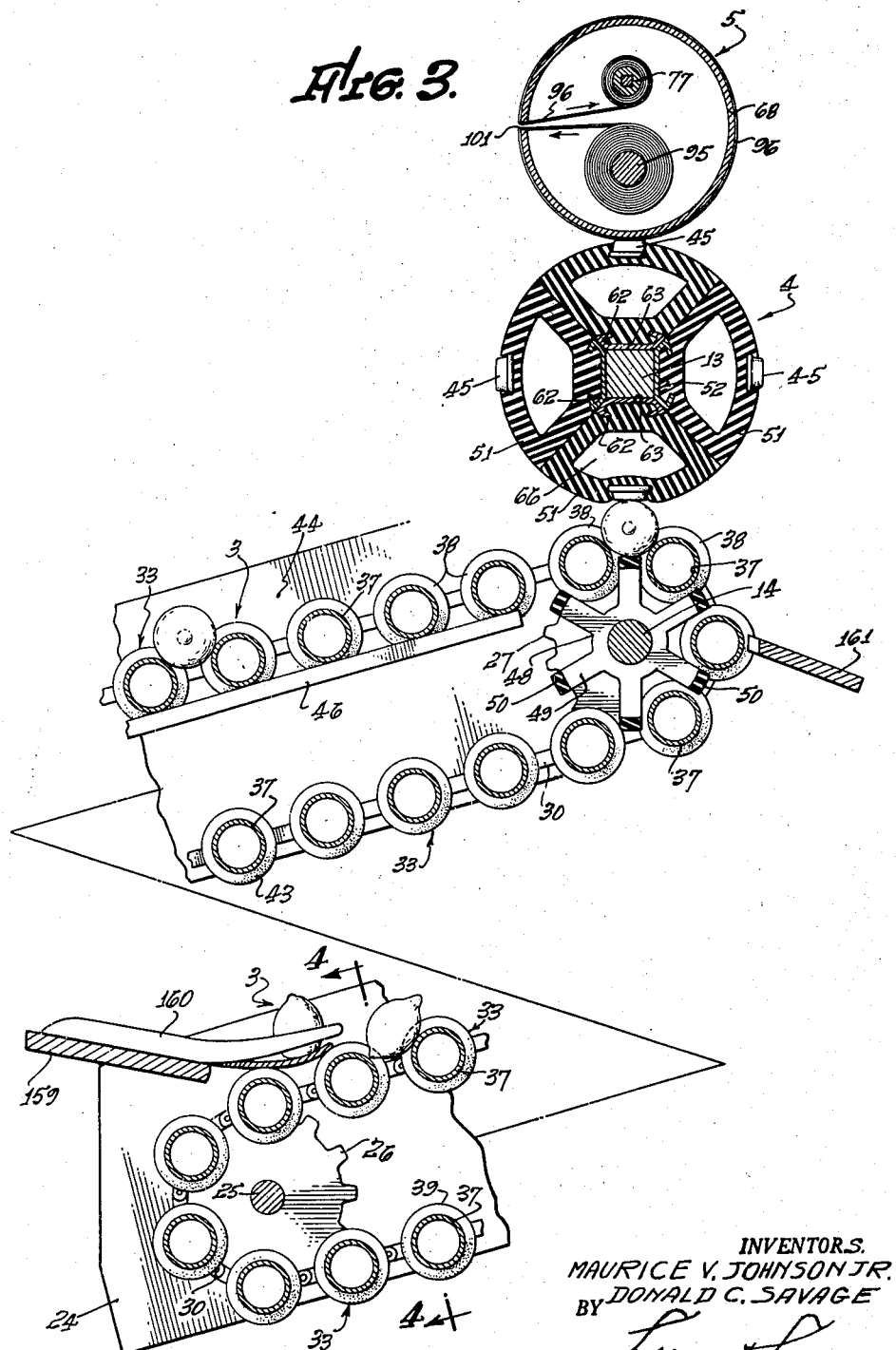

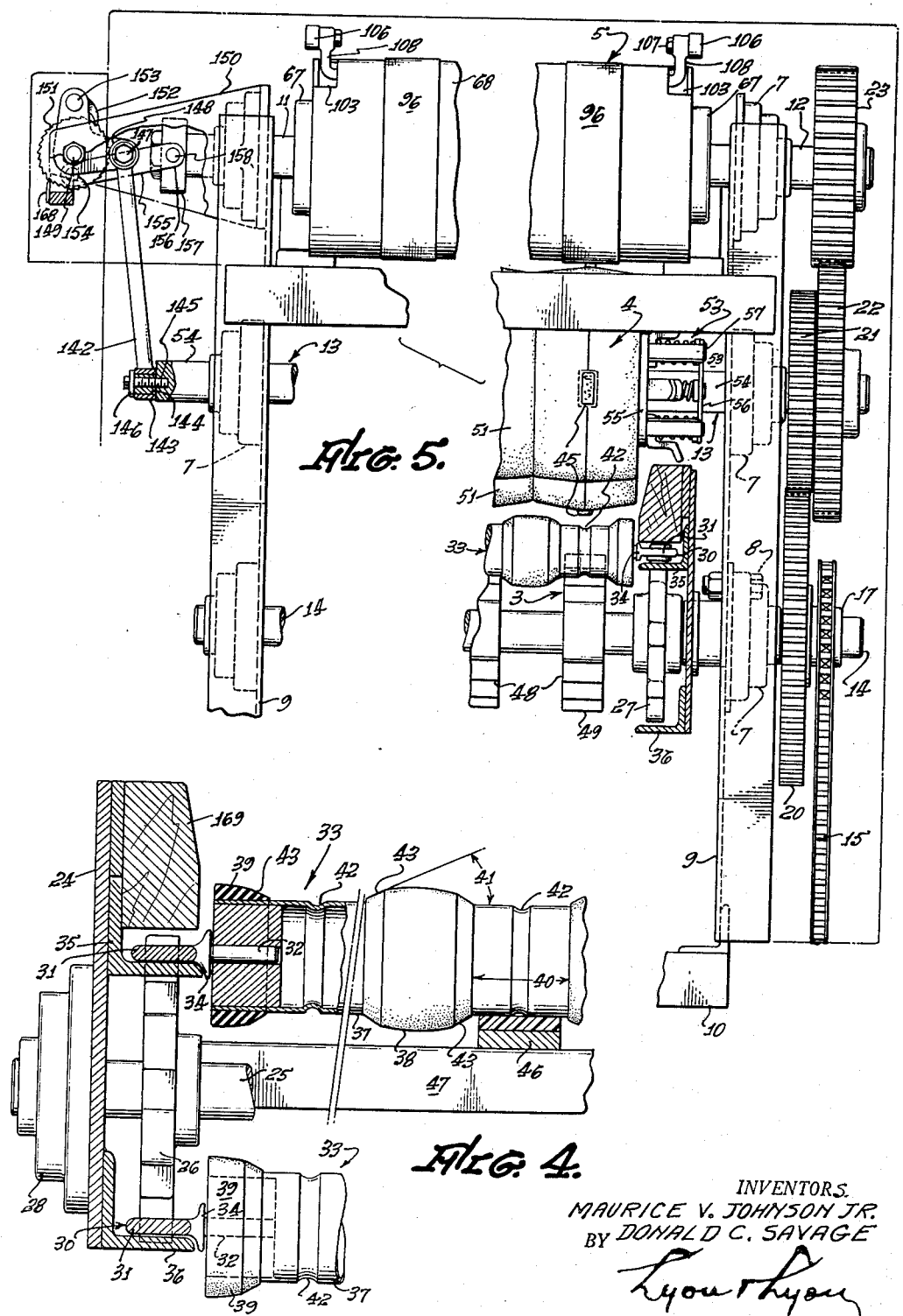

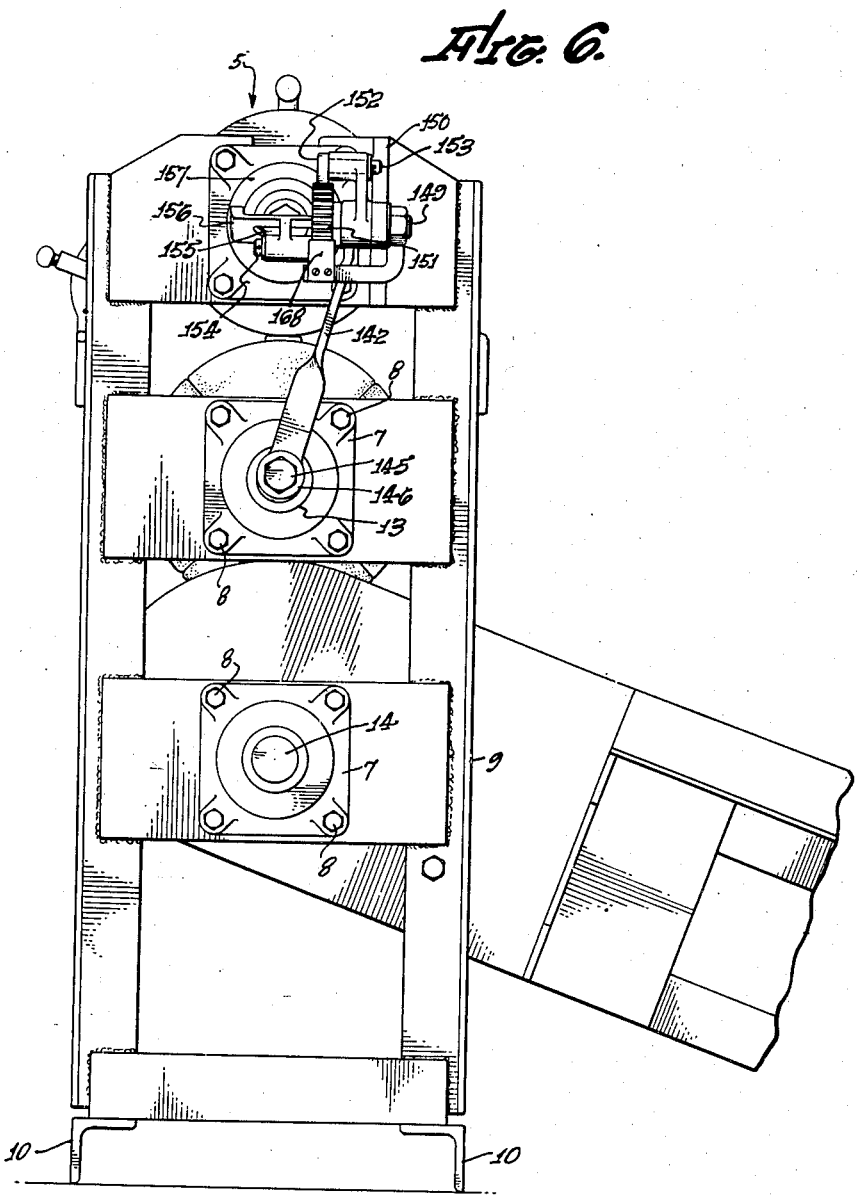

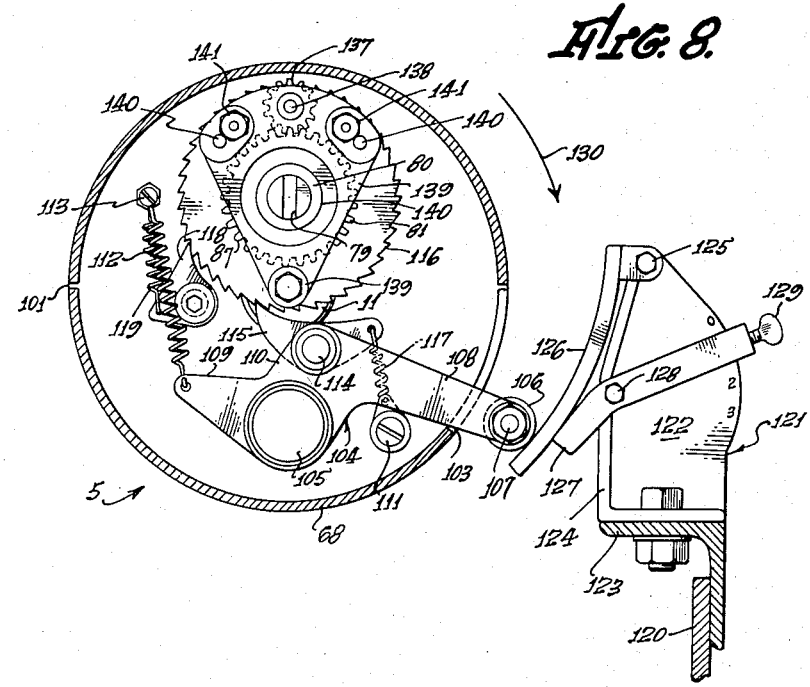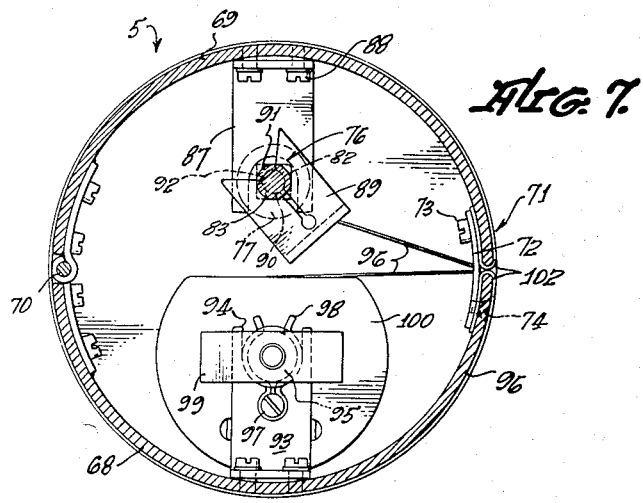

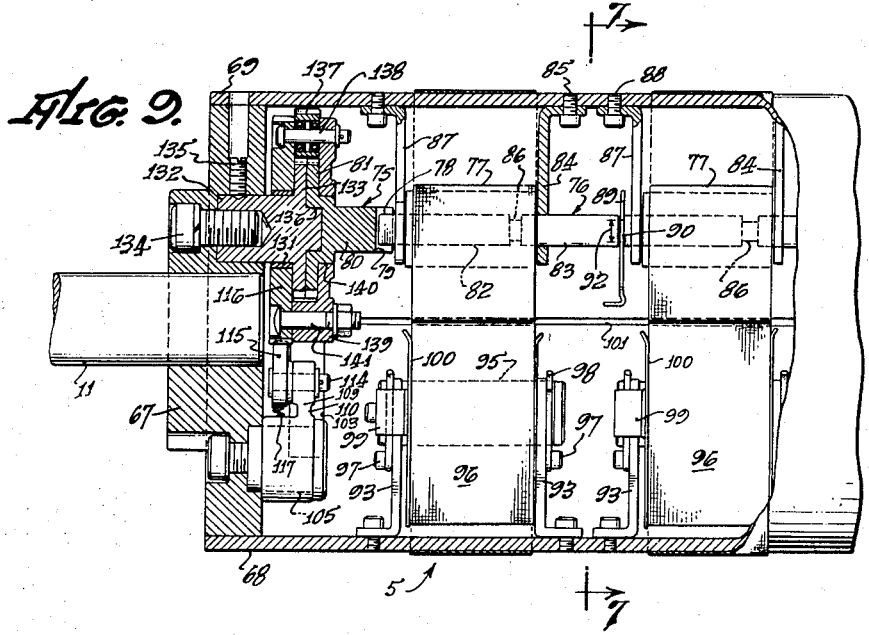

United States Patent Office 2,953,987
Patented Sept. 27, 1960

2,953,987

ROTARY INKING RIBBON TUBE

Maurice V. Johnson, Jr., Upland, and Donald C. Savage, Ontario, Calif., assignors to Sunkist Growers, Inc., Los Angeles, Calif., a corporation of California Original application Feb. 2, 1956, Ser. No. 563,045. Divided and this application Sept. 15, 1958, Ser. No. 761,054

1 Claim. (Cl. 101—336)

This invention relates to printing machines more particularly to a machine especially capable of printing citrus fruit, eggs, apples, cantaloupes, nuts, potatoes, avocados, tomatoes and other substantially cross sectionally circular objects.

This is a divisional application of our copending application Serial No. 563,045, filed February 2, 1956, entitled "Printing Machine."

Our invention will be disclosed with specific reference to the printing of trademarks or other indicia upon lemons, since that fruit, due to its ellipsoidal shape, variance in diameter from fruit to fruit and irregular and easily bruised surface, is difficult to effectively print. It will be apparent, however, that our machine is eminently adapted to print other fruits, nuts, vegetables or articles of manufacture which have a substantially circular cross section.

While many fruit and vegetable stampers or markers have been proposed, the printing of lemons with trademarks has not yet been accomplished commercially and there is not yet known a machine which will satisfactorily serve this function. The obovate to ellipsoidal form of the lemon renders it necessary to orient the fruit so that in passing through the printing assembly the smoothest, most gently rounded surface of the fruit is presented to the printing die. If the fruit is contacted by the die at either its stem or blossom end, it is evident that a true impression of the indicia will not be obtained. In addition to the problems resulting from the shape of the lemon, further problems are created by their large variation in size. The diameter of an average lemon is about 2⅛ inches but this varies from as little or less than 1½ inches to as much as 3⅛ inches or more, consequently a printing machine will not successfully print lemons which have not been previously classified as to size unless it is capable of properly functioning over at least this size range. The problem is further compounded by the fact that lemons grow in the Pacific coastal areas and in other areas having cooler climates, which account for a large percentage of the lemon production of the United States, lack resiliency and have an irregular relatively stiff inflexible peel easily subject to damage by bruising. These characteristics make it impossible to rely upon compression of the fruit itself to compensate for variation in size from fruit to fruit, which would be required if the support to die distance were fixed and unyielding. Irrespective of the size of fruit passing through the printing assembly, it is essential that there be a firm but not severe contact between every part of the die and the lemon at the time of printing. If the contact is not firm enough the indicia will not be clearly printed upon the lemon, while if it is too firm, the die may rupture the peel and possibly inoculate it with mold spores or bacteria or in any event render the fruit subject to future inoculation.

Among the further and important objects of our invention are to provide a printing machine having: an improved conveyor capable of orienting and aligning fruits, vegetables or other ellipsoidally shaped articles so that their long axes are parallel to the axes of the rollers; a rotating and reciprocating tube about which a renewable inking ribbon is continuously fed; a rotary printing drum on which dies are flexibly mounted to permit firm but yielding contact with the articles to be printed; and a rotary platen having spokes to assist the conveyor rollers in supporting fruit as it is printed.

These and further objects of our invention will become apparent from a consideration of the drawings in which:

Figure 3 is a sectional view taken on line 3—3 of Figure 1;

Figure 4 is a view, partly in section, taken on line 4—4 of Figure 3;

Figure 5 is a view taken on line 5—5 of Figure 1 with parts shown in section;

Figure 6 is an elevation showing the left hand side of our machine, part of the conveyor being omitted;

Figure 7 is a full cross sectional view of our ribbon tube taken on line 7—7 of Figure 9;

Figure 8 is a section showing our inking roller and cam face assembly taken on line 8—8 of Figure 1;

Figure 9 is a partial longitudinal section of our inking ribbon tube taken substantially on line 9—9 of Figure 1.

Figure 1:
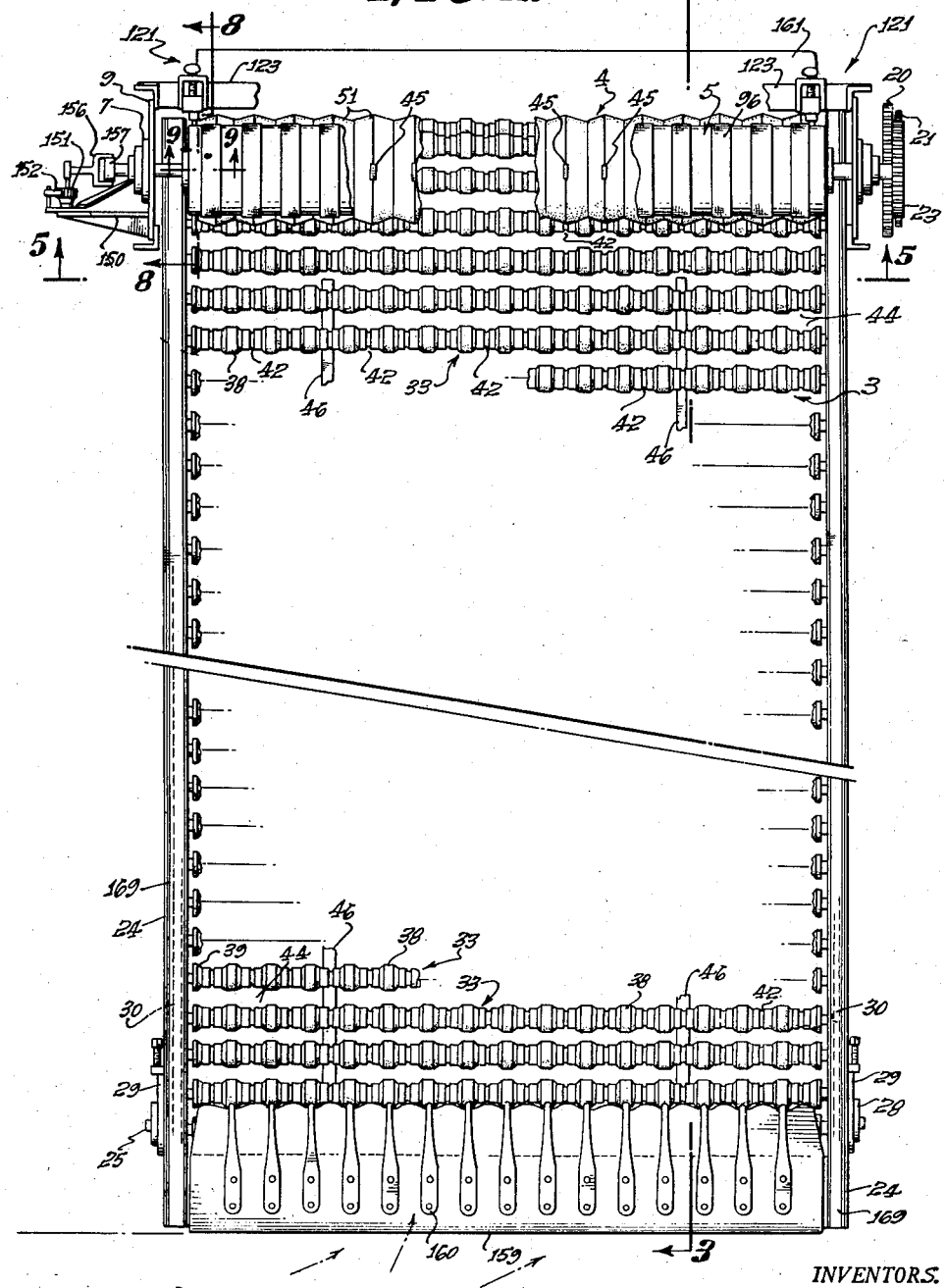
Figure 1 is a plan view of our printing machine with parts broken away for clarity.

The stub shafts 11 and 12 rotatably mounted in the bearings 7 are secured to the ribbon tube by circular end plates 67 (Figure 9). The ribbon tube assembly consists of a semicylindrical member 68 attached at either end to the end plates 67 and the semicylindrical member 69 attached to the member 68 through hinge 70 and the lock mechanism 71 (Figure 7) which consists of a lock plate 72 attached to the tube 69 with suitable cap screws 73. The lock plate is securable to semicylindrical member 68 by flat head screws 74.

At each end of the inking ribbon tube is a ribbon drive gear assembly 75 (Figure 9) which drives shaft 76 on which ribbon take-up spools 77 are detachably mounted for rotation therewith. This shaft extends from the drive gear assembly to the mid-point of the ribbon tube assembly where it is supported for rotational and longitudinal motion upon a bracket, not shown. This shaft is provided in its end with a slot 78 which receives a mating tongue 79 extending axially from shaft 80 of gear 81, thereby connecting the shaft to gear assembly 75. Shaft 76 is alternately square and round in cross section to permit quick insertion of ribbon take-up spools 77 upon the square shaft portions 82 and quick retraction of them to a freely rotatable position upon the round portions 83 thereof. This shaft is detachably supported in alignment with the gear assembly by the bearing brackets 84 secured to the semicylindrical member 69 by screws 85. Each of these brackets has a slot at one end, the width of which is equal to the diameter of annular shaft grooves 86. The slot extends inwardly to a circular bearing portion. Retaining brackets 87 are secured to the tube by screws 88 and are each provided with a U-shaped opening of sufficient width to receive the shaft. These brackets do not support the shaft but simply retain the take-up spools in a fixed longitudinal position with respect to the inking tube. It will be evident that the shaft is readily detachable by simply moving it longitudinally until annular grooves 86 are in alignment with the slots in bearing brackets 84 and then lifting it out of contact with the brackets. This could accidentally result from vibration during operation of the machine and, therefore, lock plates 89, having semicircular openings in one end, are provided to engage and be retained in annular grooves 90 formed in the shaft. The semicircular lock plate opening 91 is narrower than the diameter 92 of the annular groove, thus insuring retention of the lock plate upon the shaft. This lock plate which is readily detachable is spaced adjacent to one of the brackets 87 to prevent shaft 76 from being accidentally withdrawn from engagement with the shaft 80.

Feed spool brackets 93, having U-shaped openings 94 coinciding in size with the diameter of feed spools 95, are secured to the inner surface of the inking tube so that the axis of spools resting in said brackets are diametrically opposed and parallel to the axis of shaft 76 and take-up spools 77.

These brackets have retaining clips 98, secured thereto by means of cap screws 97, arranged to engage grooves in the feed spools to retain the latter in position. A leaf spring 99 is secured to the end of each feed spool and presses against one of a pair of ribbon aligning plates 100 mounted internally of said brackets upon each feed spool, thus providing frictional resistance to the unwinding of the spool.

As illustrated in Figures 3 and 7 inking ribbon 96 is withdrawn from the feed spool 95, inserted through ribbon feed slot 101 (Figure 3) bounded by curved flat clips 102 secured to semicylindrical members 68 and 69 on either side of said slot to provide a smooth guide surface for the ribbon edges, wound about the ribbon tube in a clockwise direction, inserted back through slot 101 and attached to take-up spool 77. As shaft 76 rotates in a clockwise direction as shown in Figure 7, the inking ribbon 96 is drawn over the outer surface of the ribbon tube and wound upon spool 77, thus constantly renewing the inking ribbon which contacts the dies 45. When the ribbon is completely used, the spools are removed from the ribbon tube assembly and new ribbon is installed.

As shown in Figure 8, the ribbon tube is slotted at 103 adjacent to and interiorly of each of the end plates 67. A pawl actuating member 104 extends through the slot and is mounted upon a stub shaft 105 secured to the end plate and is provided with a cam roller 106 rotatably mounted upon a pin 107 at its outermost end. The pawl actuating member 104 has a cam roller arm 108, a spring arm 109 and an intermediate section 110. The cam roller arm is urged against a stop pin 111, secured to the end plate 67 by means of a tension spring 112, which is attached to a pin 113 on the end plate 67 and to spring arm 109. A pawl 115 is pivotally mounted on the intermediate section 110 by means of pivot 114. One end of pawl 115 is maintained in contact with a ratchet wheel 116 by means of a spring 117 secured to the stop pin 111 and to the other end of the pawl. A stop pawl 118, one end of which is maintained in contact with the ratchet 116 by tension spring 119 secured to the other end of the pawl and to pin 113, restrains the ratchet wheel against reverse rotation.

Member 120 is attached to side frames 9 and supports a transverse angle iron 123 to which a cam assembly 121 is bolted. The cam assembly 121 includes an arcuately shaped body member 122 having a flange 124 which supports cam 126 on pivot 125. This cam is extendable or retractable with respect to the path of movement of cam roller 106 by swinging it about pivot 125 by means of a lever 127, mounted upon pivot 128 and having a thumb screw 129 adapted to secure the lever to arcuate body member 122 at varying positions to hold the cam in the selected position.

In the representation of Figure 8 the inking ribbon tube rotates in the direction of the arrow 130. The cam assmbly 121 is mounted at a distance from the inking ribbon tube that will permit movement of the cam 126 to positions varying from that at which the cam roller will not contact it to positions where the cam roller will be so contacted as to result in the maximum travel of cam roller arm 108. Inasmuch as the extent of movement of ratchet wheel 116 depends upon the extent of movement of arm 108, it will be seen that by adjusting cam 126 any desired rate of ribbon feed may be selected. As illustrated, the lever 127 is secured to arcuate body portion 122 by the thumb screw 129 at the position which will result in rotation of the ratchet 116 a total distance of one tooth by the pawl 115 and the pawl actuator arm 104.

As shown in Figure 9 the ratchet wheel 116 is mounted for rotation upon a journal portion 131 of the shaft 132 of gear 133 secured to the end plate 67 by cap screw 134 and set screw 135. Gear 133 is adjacent to gear 81 and the former is journaled at 136 to permit free rotation of gear 81. A planetary gear 137, engaging both gears 81 and 133, is retained in mesh with each of these gears by being rotatably secured to ratchet 116 and an annular alignment plate 139 by a pin 138. This plate is free to rotate upon hub 140 of gear 81. The ratchet 116 and the alignment plate 139 are further maintained in alignment and secured together by dowel pins and by bolts 141.

When the inking tube assembly is rotated in the direction of the arrow 130 of Figure 8 upon the shafts 11 and 12, the cam roller arm will contact the cam once each revolution and will be impelled tangentially in a counterclockwise direction about stub shaft 105, thus causing the pawl 115 to move the ratchet 116 in a clockwise direction. The planetary gear 137, being secured to the ratchet, rotates about and in mesh with the fixed gear 133 and the moveable gear 81. Each of these gears is provided with a different number of gear teeth in order to cause relative motion of one with regard to the other. For example, fixed gear 133 may be provided with forty teeth while the rotatable gear 81 is provided with thirty-nine teeth. The diametral pitch of these gears as well as that of the planetary gear is the same so that the latter gear will be in proper mesh with both the fixed and the moveable gears. It will be apparent that for every complete revolution of planetary gear 137 about the fixed gear 133, the planetary gear will have engaged forty teeth. In order to engage forty teeth of gear 81, this gear must rotate in a counterclockwise direction, opposite to the direction of revolution of the planetary gear. Thus for each revolution of the planetary gear, gear 81 will rotate a distance equal to one tooth. Shaft 76, as well as ribbon take-up spool 77, will rotate in the same direction as gear 81 since the shaft is driven by this gear.

As the take-up spools 77 rotate, they wind the spent inking ribbon upon them and cause the ribbon to be unwound from the spools 95 drawing it over the outer surface of the ribbon tube. The rotation of the take-up spools 77 results in the continuing renewal of inking ribbon 96 thus providing a constant ink supply for the printing dies 45.

It will be noted that the inking ribbon, which is continually fed about the inking tube, is wider than the dies 45. It is possible to greatly extend the period between required changes of ribbon by employing a wide ribbon and reciprocating the inking tube a distance substantially equal to its width. The structure of the ribbon tube reciprocating assembly will be evident from a consideration of Figures 1, 5 and 6. This assembly is driven by a pitman 142 having a bearing 143, within which an eccentric 144 is journaled. The eccentric is secured to the die holder shaft 13 by a bolt 145 and a retaining washer 146. As the eccentric 144 rotates with the shaft 13, pitman 142 reciprocates. The pitman is pivotally secured by means of a pin 147 to a V-shaped pawl actuator 148 which is mounted on pivot 149 secured to bracket 150 mounted on side frame 9. A ratchet wheel 151 is also mounted upon pin 149 for rotation by means of pawl 152 pivoted at 153 to the pawl actuator 148 for engagement with the teeth of ratchet 151. One end of a driving rod 155 is eccentrically journaled to the ratchet on pivot 154; the other end is in the form of a yoke 156 pivoted to a ribbon tube shaft thrust bushing 157 by means of pins 158. It will be apparent that upon rotation of the shaft 13 pitman 142 will reciprocate, thus translating motion to the pawl actuating arm. When the pitman moves upwardly, the pawl 152 rides over the top of the teeth of ratchet 151 and when it moves downwardly the pawl engages ratchet teeth rotating ratchet 151 in a clockwise direction as viewed in Figure 5, thus causing the ribbon tube to be reciprocated in its bearings 7. A suitable stop-pawl 168 is secured to the frame member and engages the teeth of ratchet 151 to prevent reverse rotation.

As shown in Figures 1 and 3, we provide a delivery board 159 for our conveyor. This is secured to the side plates 24 and is provided with a plurality of fingers or guides 160 mounted at positions corresponding with the locations of the sleeves 38 of each individual roller. While these guides assist in assuring that individual aligned pockets such as those indicated by the reference numeral 44 receive only a single fruit, they are not essential to the proper functioning of our conveyor unit.

Figure 2:
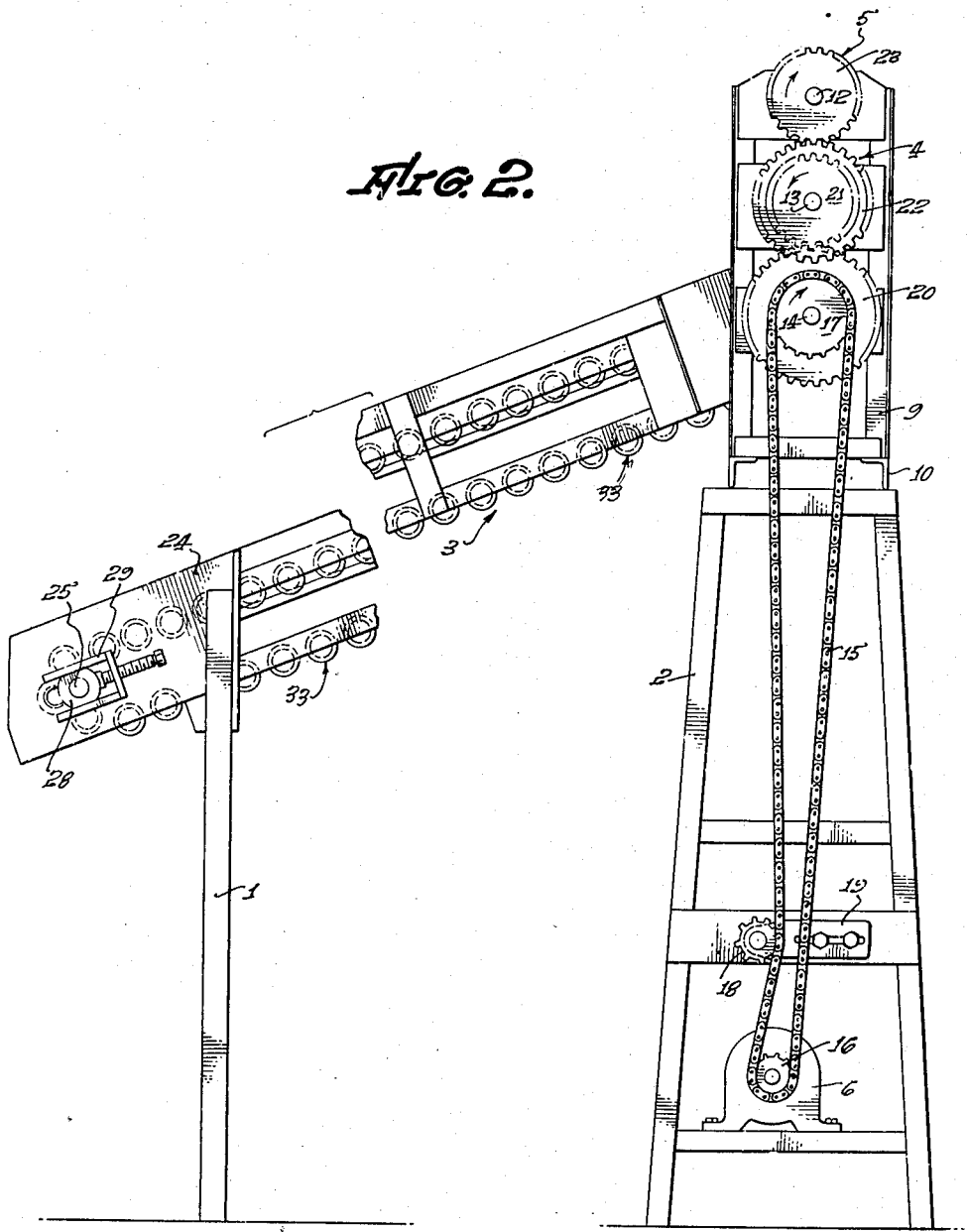
Figure 2 is an elevation showing the right hand side of our machine.

In operation our printing machine is installed so that a conveyor belt, not shown, will feed lemons to the delivery board and so that dropboard 161 secured adjacent the delivery end of the conveyor directs the printed fruit to a receiving conveyor, a sizer or to other lemon treating apparatus. Upon operation of the motor 6, drive chain 15 rotates the sprocket 17 on the shaft 14, thus rotating sprockets 27 which drive the pair of chains 30 and move the upper run of conveyor rollers toward the printing drum. As these rollers progress they are contacted by a roll actuating member 46, which causes each roller to rotate in a clockwise direction as viewed in Figure 3. This rotation permits the retention of but a single fruit within the individual pockets 44 defined by adjacent rollers 33. As previously noted, the rotation and the particular shape of these rollers are responsible for the orientation of the longitudinal axis of each fruit to a position parallel to the axis of the rollers. In addition, the annular channel 42 and the angled shoulders 43 result in the transverse alignment of individual lemons with the dies 45, thus presenting the most gently rounded surface of the lemon to the die for printing. The die holder drum 4 is rotated in a counter-clockwise direction in the illustrations of Figures 2 and 3 by gear 21 which is driven by gear 20 secured to the shaft 14. Each individual die 45 contacts the inking ribbon at a point diametrically opposed from the point of printing. The inking ribbon tube is rotated in a clockwise direction, as seen in Figures 2 and 3, by gear 23 driven by gear 22 secured to the die holder shaft 13.

With each revolution of the inking ribbon tube 5, the cam roller 106 contacts cam 126 to cause rotation of inking ribbon take-up spools 77 as previously described. This ribbon is rotated about the inking ribbon tube 71 in the manner shown in Figure 9. As the ribbon is wound upon spools 77, it is drawn over the surface and unwound from the ribbon supply spool 95.

As the ribbon tube 71 rotates about its own axis and as the inking ribbon moves relative to the surface of said tube, the tube reciprocates along its longitudinal axis in the manner set forth hereinabove and as illustrated best in Figure 5.

A factor of further importance to be considered is the relationship between the radii of gears 22 and 23. It will be seen that the radius of gear wheel 22 is the same as the radius of the circle of rotation of the dies 45, while the radius of gear 23 is the same as the radius of the inking ribbon tube 5. Since the peripheral velocities of gears 22 and 23 and the peripheral velocity of the inking ribbon tube are the same, there will be no relative velocity between the inking ribbon and the dies 45. There will, as a result, be a lessened frictional contact between the dies 45 and the inking ribbon, thus preventing, as much as possible, the wearing down of the inking ribbon and the dies. We have found that relative velocity of the ribbon with respect to the dies can be completely avoided adjusting the position of engagement of gears 22 and 23 so that one of the dies has just passed its position of contact with the ribbon when cam roller 106 strikes cam face 126. Thus, ribbon 96 will travel over the circumferential surface of the ribbon tube when no die is in contact with it.

While we have exemplified the novel inventive aspects of our printing machine with reference to the problem of printing lemons, it will be apparent that our machine is equally adapted for the impression of brands upon other cross sectionally circular articles and specifically oranges, grapefruit, apples, potatoes, tomatoes, nuts, avocadoes and other fruits and vegetables.

We claim:

A rotary inking ribbon tube comprising: a cylindrical casing having a pair of circular end plates, said casing having a slotted section along a portion of its circumference adjacent to each of said end plates; a stub shaft secured interiorly to each of said end plates; a pawl actuating member pivoted on said stub shaft, said actuating member having an actuating arm extending through said slotted section, said arm being provided at its terminal end with a cam follower, said actuating member having a pawl; a gear fixedly secured to each of said end plates and having first and second journals; a ratchet rotatably mounted upon said first journal; a rotary gear having a number of teeth differing from the number of teeth on said fixed gear mounted upon said second journal; a planetary gear rotatably secured to said ratchet, said planetary gear being in mesh with said fixed and said rotary gears; a ribbon take up shaft detachably secured to said rotary gear and extending axially therefrom and supported for rotation upon brackets within said casing; a plurality of ribbon take up spools detachably secured to said take up shaft at positions axially of said shaft; a plurality of ribbon supply spools each adapted to support inking ribbons carried thereon mounted for rotation upon brackets secured to said casing, said ribbon supply spools having their axes parallel to and spaced equidistantly from the axis of said take up shaft and being in transverse alignment with said ribbon take up spools, said ribbons extending from said supply spools through axial slots provided in the circumference of said casing over the external surface of said casing and back through said slots to said ribbon take up spools and a pair of cams mounted adjacent to but spaced radially from said end plates a distance sufficient to be contacted by the cam follower on said actuating arm and to deflect said pawl actuating member with each rotation of said ribbon tube.

References Cited in the file of this patent

UNITED STATES PATENTS

| 866,624 | Collier | Sept. 24, 1907 |
| 1,715,893 | Bertinetti et al. | June 4, 1929 |
| 2,537,397 | Collender | Jan. 9, 1951 |